United States Patent [19]

Shaw

[11] Patent Number: 5,419,856
[45] Date of Patent: May 30, 1995

[54] METHOD AND MOLD FOR MAKING A DECORATIVE ICE BOWL

[76] Inventor: Linda S. Shaw, 1924 Irvine Ave., Newport Beach, Calif. 92660

[21] Appl. No.: 100,499

[22] Filed: Jul. 30, 1993

[51] Int. Cl.$^6$ ............................................. F25C 1/22
[52] U.S. Cl. ........................................ 264/28; 62/1; 249/55; 249/149; 249/219.1
[58] Field of Search .................. 62/1; 264/28; 249/55, 249/144, 146, 148, 149, 219.1

[56] References Cited

U.S. PATENT DOCUMENTS

| | | | |
|---|---|---|---|
| 612,803 | 10/1898 | Epstein | 249/149 |
| 881,183 | 3/1908 | Guyer | 249/146 |
| 942,403 | 12/1909 | McCoy | 249/146 |
| 2,939,299 | 6/1960 | Sherbloom | 62/1 |
| 3,710,589 | 1/1973 | Brown et al. | 426/109 |
| 4,206,899 | 6/1980 | Whitehead | 264/28 |
| 4,550,575 | 11/1985 | DeGaynor | 264/28 |
| 4,669,271 | 6/1987 | Noel | 249/55 |
| 4,807,844 | 2/1989 | Tu | 249/144 |
| 4,971,737 | 11/1990 | Infanti | 264/28 |

OTHER PUBLICATIONS

Decorations, 45, "Decorative Ice Bowls".

Primary Examiner—Mathieu D. Vargot
Attorney, Agent, or Firm—Stetina Brunda & Buyan

[57] ABSTRACT

An ice mold including an outer bowl and an inner bowl which is sized to be receivable into the outer bowl. Also provided is a bracket member which is releasably engageable to the upper rims of the inner and outer bowls and adapted to maintain the inner bowl in a desired orientation relative to the outer bowl when a quantity of fluid is poured into the outer bowl and the inner bowl is inserted into the outer bowl in a manner forcing the fluid upwardly between the inner and outer bowls.

23 Claims, 2 Drawing Sheets

Fig. 8

METHOD AND MOLD FOR MAKING A DECORATIVE ICE BOWL

FIELD OF THE INVENTION

The present invention relates generally to molds, and more particularly to a bowl and bracket mold assembly for the formation of decorative ice bowls.

BACKGROUND OF THE INVENTION

In addition to the inclusion of ice sculptures on a serving table, a practice enjoying growing popularity is the serving of certain items such as sorbet and fruit salad in decorative ice bowls. Currently, these decorative ice bowls are typically formed through the use of a pair of bowls, wherein one bowl of the pair is substantially smaller in size than the other bowl and thus receivable thereinto in a nested fashion. In this respect, the smaller, inner bowl is placed within quantity of water poured into the larger, outer bowl with water being forced upwardly between the bowls to a level of approximately 1½ inches below the rim of the outer bowl. As will be recognized, the placement of the inner bowl into the water causes it to float, thus normally elevating the rim thereof above the rim of the outer bowl. Since it is desirable to keep the rims of the inner and outer bowls level, disposed within the inner bowl is a jar which is filled with water for purposes of increasing the weight of the inner bowl. In this respect, water is poured into the jar until such time as the weight of the inner bowl is increased sufficiently so as to cause the rim thereof to be substantially level with the rim of the outer bowl. Once the rims of the inner and outer bowls have been leveled, the position of the inner bowl relative the outer bowl is maintained by extending at least two strips of tape over the bowl rims and jar in an X-shaped pattern.

After the tape strips have been extended across the bowls and jar in the aforementioned manner, selected plant material for decorating the ice bowl such as mountain ash berries, cabbage leaves, miniature amaryllis flowers, sprigs of cypress, and small red roses, are slipped into the water between the bowls. The leaves and flowers are preferably prodded to desired locations within the space defined between the bowls through the utilization of a straight floral wire. The larger leaves are typically wedged toward the bases of the bowls, with the flowers being gently squeezed between the sides thereof.

After the leaves and flowers have been selectively positioned in the water between the two bowls, the entire assembly is placed in a freezer and the water frozen. Thereafter, the tape is removed from the bowls and jar, with the jar subsequently being removed from within the inner bowl. Cold water is then poured into the smaller, inner bowl, with the outer, larger bowl itself being dipped into cold water. As will be recognized, warm water is not utilized since the use of the same may cause the ice bowl to crack. After the cold water is poured into the inner bowl and the outer bowl is dipped into the cold water, the bowls will gradually separate from the ice bowl formed therebetween. After the ice bowl is removed from the outer bowl, the same is ready to have a desired food product introduced into the interior thereof.

Though the aforementioned mold components and fabrication process are generally suitable for forming a decorative ice bowl, this construction method has certain deficiencies which detracts from its overall utility. Foremost of these deficiencies is the necessity of having to utilize strips of tape to maintain the inner bowl in a desired orientation relative the outer bowl, and the jar in an upright orientation within the inner bowl. In this respect, when the complete assembly is disposed within a freezer, the below freezing temperatures often adversely affect the adhesive of the tape thus causing the same to become dislodged from the inner and outer bowls, and/or jar. This dislodging often results in a shift of the orientation of the inner bowl relative the outer bowl, thus causing the resultant ice bowl to be formed with a visually apparent, non-uniform wall thickness. The drifting of the inner bowl relative the outer bowl also occurs if insufficient tension is exerted in the tape strips when extending the same across the bowls and jar. Further, the use of the tape strips, as well as the water-filled jar to increase the weight of the inner bowl, is clumsy and makes it difficult to accurately position the inner bowl relative the outer bowl, thus again often resulting in the subsequent formation of an ice bowl having a non-uniform wall thickness. The present invention overcomes these and other deficiencies associated with prior art decorative ice bowl fabricating products and methods.

SUMMARY OF THE INVENTION

In accordance with a first, preferred embodiment of the present invention there is provided an ice mold comprising an outer bowl and an inner bowl which is sized to be receivable into the outer bowl. Releasably engageable to the upper rims of the inner and outer bowls is a bracket member which is adapted to maintain the inner bowl in a desired orientation relative the outer bowl when a quantity of fluid is poured into the outer bowl and the inner bowl is inserted into the fluid in a manner forcing it upwardly between the inner and outer bowls. In the first embodiment, the bracket member comprises a central hub member having a first pair of elongate arm segments attached thereto in opposed, linear relation, with each of the segments of the first pair being telescopically receivable into the hub member and including a distal end adapted to be releasably engageable to the upper rim of the outer bowl when the first pair of segments are extended diametrically thereacross. Also attached to the hub member is second pair of elongate arm segments which also extend outwardly therefrom in opposed, linear relation to each other and are oriented in perpendicular relation the segments of the first pair. Like the first pair of arm segments, each of the segments of the second pair is telescopically receivable into the hub member and includes a distal end adapted to be releasably engageable to the upper rim of the outer bowl when the second pair of segments are extended diametrically thereacross. Slidably attached to and selectively positionable along each of the arm segments of first and second pairs is a retention member. In the first embodiment, the retention members are positioned on respective arm segments of the first and second pairs in a manner wherein the retention members capture the upper rim of the inner bowl when the distal ends of the arm segments are engaged to the upper rim of the outer bowl.

In a second embodiment of the present invention, the bracket member comprises first and second elongate arms which are pivotably connected to each other and are each sized to extend diametrically across the upper rim of the outer bowl. In this respect, the opposed distal ends of each of the elongate arms are adapted to be releasably engageable to the upper rim of the outer bowl. Slidably attached to and selectively positionable along the length of the first arm is a first pair of retention members, while slidably attached to and selectively positionable along the length of the second arm is a second pair of retention members. In the second embodiment, the first and second pairs of retention members are positioned on the first and second arms, respectively, in a manner wherein the retention members capture the upper rim of the inner bowl when the distal ends of the first and second arms are engaged to the upper rim of the outer bowl.

In accordance with a third embodiment of the present invention, there is provided a bracket member which is substantially identical to the bracket member previously described with respect to the second embodiment, but further includes pairs of hinge portions disposed intermediate the distal ends of each arm for allowing the distal ends of the first and second arms to be selectively angled downwardly. Additionally, in accordance with a fourth embodiment of the present invention there is provided a bracket member which is substantially identical to the bracket member of the first embodiment, but further includes an elongate coupling member having a bottom end which is rigidly attached to the inner bowl and a top end which is threadably engaged to the hub member. In this respect, the clockwise rotation of the coupling member is adapted to mechanically lower the level of the inner bowl relative the outer bowl, while the counter-clockwise rotation of the coupling member is adapted to raise the level of the inner bowl relative the outer bowl.

As will be recognized, the inner and outer bowls need not necessarily form part of the present invention in that the bracket members constructed in accordance with the first, second and third embodiments may be interfaced to existing bowls.

Further in accordance with the present invention, there is provided a method for forming a decorative ice bowl. The preferred method generally comprises the steps of pouring a quantity of fluid into an outer bowl and inserting an inner bowl into the fluid in a manner forcing it upwardly between the inner and outer bowls. To aid in maintaining downward pressure on the inner bowl, an additional quantity of fluid may be poured thereinto thus increasing the weight thereof. Subsequent to the insertion of the inner bowl into the fluid, a bracket member is attached to the upper rim of the outer bowl in a manner wherein each of the elongate arms of the bracket member are extended diametrically across the upper rim of the outer bowl as well as the upper rim of the inner bowl therein. First and second pairs of retention members which are slidably attached to respective ones of the elongate arms are then positioned in a manner capturing the upper rim of the inner bowl thus maintaining the inner bowl in a desired orientation relative the outer bowl. The force of engagement of the distal ends of the arms to the upper rim of the outer bowl is sufficient to overcome the upward pressure exerted against the bracket member by the inner bowl thus causing the inner bowl to remain submerged within the fluid. The preferred method may further include the steps of adjusting the lengths of the bracket member arms and selectively angling the distal ends of the arms downwardly to properly engage the distal ends to the upper rim of the outer bowl, as well as the step of selectively rotating the coupling member to adjust the level of the inner bowl relative the outer bowl.

BRIEF DESCRIPTION OF THE DRAWINGS

These as well as other features of the present invention will become more apparent upon reference of the drawings wherein.

DETAILED DESCRIPTION OF THE PREFERRED EMBODIMENTS

Figures 1, 2, 3, 4, 5, 6, 7:
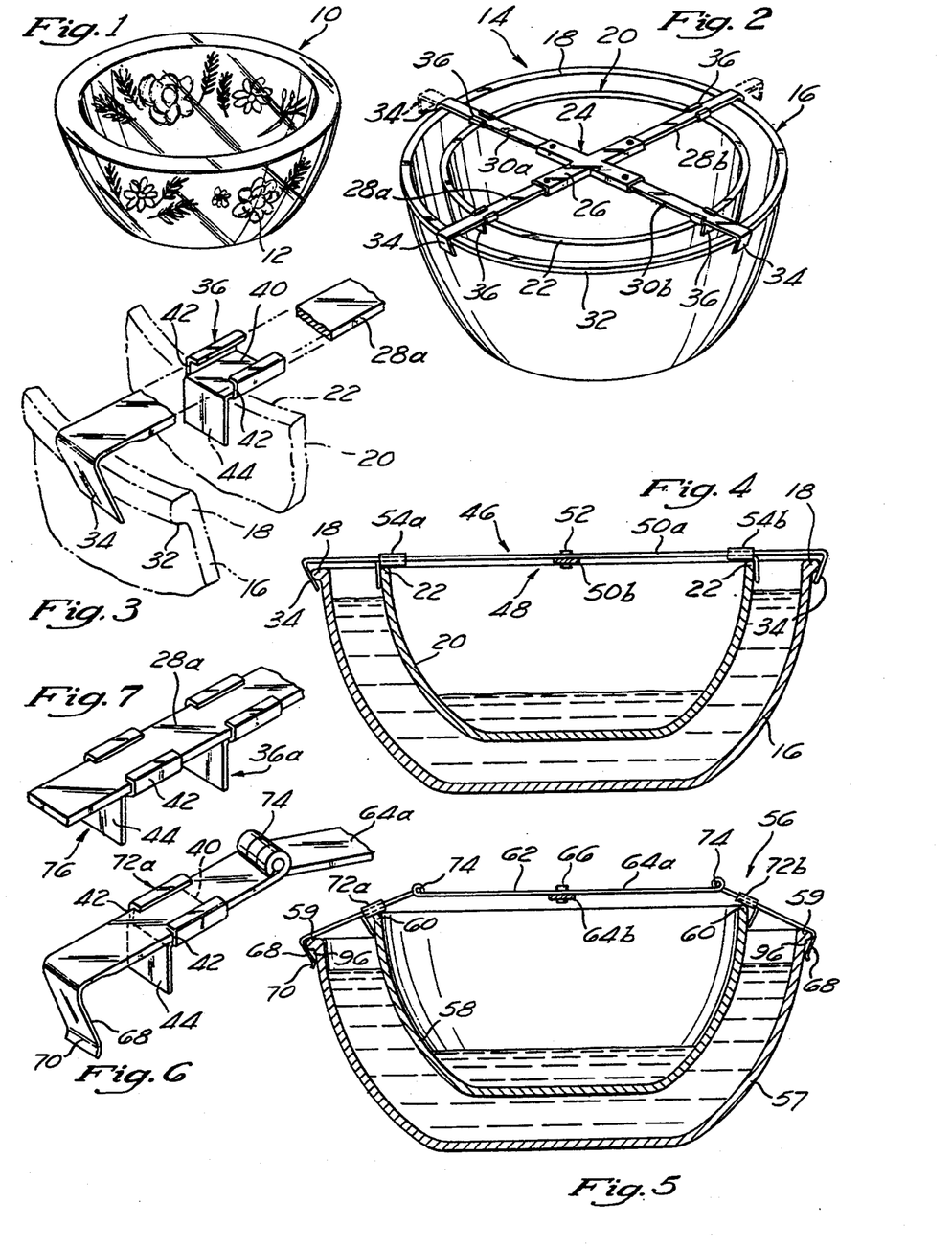
FIG. 1 is a perspective view of a decorative ice bowl formed utilizing an ice mold of the present invention.
FIG. 2 is a perspective view of an ice mold incorporating a bracket member constructed in accordance with a first embodiment of the present invention.
FIG. 3 is a partial perspective view illustrating the manner in which the bracket member of the ice mold shown in FIG. 2 is engaged to the upper rims of the inner and outer bowls of the mold.
FIG. 4 is a cross-sectional view of an ice mold incorporating a bracket member constructed in accordance with a second embodiment of the present invention.
FIG. 5 is a cross-sectional view of an ice mold incorporating a bracket member constructed in accordance with a third embodiment of the present invention.
FIG. 6 is a partial perspective view of the bracket member used in the ice mold shown in FIG. 5.
FIG. 7 is a partial perspective view illustrating an alternative configuration for the distal ends of the bracket members shown in FIGS. 2, 4, and 5.

Referring now to the drawing wherein the showings are for purposes of illustrating preferred embodiments of the present invention only, and not for purposes of limiting the same, FIG. 1 perspectively illustrates a decorative ice bowl 10 fabricated using an ice mold of the present invention. The ice bowl 10 is preferably formed in a manner wherein decorative materials 12 such as flowers and large leaves are suspended within the peripheral surfaces thereof and easily viewable, thus providing the ice bowl 10 with its decorative aesthetic features.

Referring now to FIG. 2, there is depicted an ice mold 14 constructed in accordance with a first embodiment of the present invention. In the first embodiment, the ice mold 14 generally comprises an outer bowl 16 which defines an upper rim 18 and an inner bowl 20 which defines an upper rim 22 and is sized to be receivable into the outer bowl 16. Releasably engageable to the upper rims 18, 22 of the outer and inner bowls 16, 20 is a bracket member 24 which is adapted to maintain the inner bowl 20 in a desired orientation relative the outer bowl 16 when a quantity of fluid (typically water) is poured into the outer bowl 16 and the inner bowl 20 is inserted into the outer bowl 16 in a manner forcing the fluid upwardly between the inner surface of the outer bowl 16 and the outer surface of the inner bowl 20.

In the first embodiment, the bracket member 24 generally comprises a central hub member 26 having a first pair of elongate arm segments 28a, 28b attached thereto in opposed, linear relation. Each of the segments 28a, 28b of the first pair is telescopically receivable into the hub member 26 and includes a distal end adapted to be releasably engageable to the upper rim 18 of the outer bowl 16 when the segments 28a, 28b are extended diametrically across the outer and inner bowls 16, 20 as seen in FIG. 2.

Also attached to the hub member 26 is a second pair of elongate arm segments 30a, 30b which also extend outwardly therefrom in opposed, linear relation to each other and are oriented in generally perpendicular relation to the segments 28a, 28b of the first pair. Additionally, like the segments 28a, 28b, the segments 30a, 30b of the second pair are telescopically receivable into the hub member 26 and include distal ends adapted to be releasably engageable to the upper rim 18 of the outer bowl 16 when the segments 30a, 30b are extended diametrically across the outer and inner bowls 16, 20.

As best seen in FIG. 3, the upper rim 18 of the outer bowl 16 is preferably formed having a radially extending lip 32 thereabout. In this respect, to facilitate the releasable engagement of the segments 28a, 28b, 30a, 30b to the upper rim 18, the distal ends thereof are preferably formed to include flexible tab portions 34 of reduced thickness which are angled downwardly and inwardly toward the hub member 26. In the first embodiment, the distal ends of the segments 28a, 28b, 30a, 30b are releasably engaged to the upper rim 18 by bowing the tab portions 34 slightly outwardly, thus allowing the upper rim 18 to be inserted between each of the tab portions 34 in the manner shown in FIG. 2. Advantageously, the formation of the upper rim 18 with the lip 32 thereabout aids in preventing the bracket member 24 from being easily dislodged from the upper rim 18, as will be discussed in more detail below.

Slidably attached to and selectively positionable along each of the segments 28a, 28b, 30a, 30b of the first and second pairs is a retention member 36. In the first embodiment, the retention members 36 each comprise a sleeve portion 40 defining a pair of elongate slots 42 which are disposed in spaced, parallel relation and are adapted to receive the opposed longitudinal edges of a respective arm segment. Extending downwardly from one end of the sleeve portion 40 is a vertically oriented wall portion 44. The retention members 36 are positioned on respective arm segments 28a, 28b, 30a, 30b in a manner wherein the wall portion 44 of each retention member 36 is abutted against the outer surface of the inner bowl 20 so as to capture the upper rim 22 of the inner bowl between the retention members 36 when the distal ends of each of the arm segments 28a, 28b, 30a, 30b are engaged to the upper rim 18 of the outer bowl 16.

As will be recognized, when the inner bowl is inserted into the fluid poured into the outer bowl, the tendency of the inner bowl 20 will be to float on the fluid. As such, to force the fluid upwardly between the outer and inner bowls 16, 20, the inner bowl 20 must be forced downwardly into the fluid by applying downward pressure to the upper rim 22 thereof. In this respect, to maintain the fluid at an elevated level between the outer and inner bowls 16, 20, the downward pressure applied to the upper rim 22 of the inner bowl 20 must be constant. Advantageously, when the bracket member 24 is attached to the upper rim 18 of the outer bowl 16 in the previously described manner, the inner bowl 20 is forced downwardly into the fluid by the downward pressure applied to the upper rim 22 thereof by the arm segments 28a, 28b, 30a, 30b, and more particularly, the sleeve portions 40 of the retention members 36. Importantly, the holding force exerted by the tab portions 34 on the upper rim 18 of the outer bowl 16 is sufficient to prevent the bracket member 24 from being dislodged from the upper rim 18 and thus maintain the inner bowl 20 within the fluid despite the upward pressure exerted thereagainst by the fluid. As previously specified, each of the retention members 36 is oriented such that the wall portions 44 thereof are abutted against the outer surface of the inner bowl 20 adjacent the upper rim 22 thereof. Advantageously, this particular positioning of the retention members 36 maintains the inner bowl 20 in a desired orientation, i.e. in centered relation to, the outer bowl 16. Additionally, though the retention members 36 are slidably positionable along respective arm segments, there is sufficient frictional engagement between the retention members 36 and the arm segments to prevent the inner bowl 20 from floating or drifting within the outer bowl 16 as the fluid is being frozen, thus eliminating the formation of a resultant ice bowl 10 with an uneven wall thickness.

Since the arm segments 28a, 28b, 30a, 30b are telescopically received into the hub member 26 and the retention members 36 are selectively positionable along respective arm segments, the bracket member 24 may be used with inner and outer bowls having differing upper rim diameters. In this respect, the maximum and minimum rim diameters of the outer bowls with which the bracket member 24 may be utilized is limited by the maximum distances at which the arm segments 28a, 28b, 30a, 30b may be telescoped into and from the hub member 26. Referring now to FIG. 4, illustrated is an ice mold 46 constructed in accordance with a second embodiment of the present invention. In the second embodiment, the ice mold 46 includes the outer bowl 16 and the inner bowl 20, as well as a bracket member 48 which is releasably engageable to the upper rims 18, 22 of the outer and inner bowls 16, 20. Like the bracket member 24, the bracket member 48 is used for maintaining the inner bowl 20 in a desired orientation relative the outer bowl 16 when a quantity of fluid is poured into the outer bowl 16 and the inner bowl 20 is inserted into the fluid in a manner forcing it upwardly between the inner surface of the outer bowl 16 and the outer surface of the inner bowl 20.

In the second embodiment, the bracket member 48 comprises a pair of elongate arms 50a, 50b, each of which are sized to extend diametrically across the upper rim 18 of the outer bowl 16, and include opposed distal ends adapted to be releasably engageable to the upper rim 18. The opposed, distal ends of the arms 50a, 50b are identically configured to the distal ends of the arm segments 28a, 28b, 30a, 30b and thus are secured to the upper rim 18, and more particularly the lip 32 extending thereabout, in the previously described manner. The arms 50a, 50b are pivotally connected to each other via a pivot pin 52 which extends through the approximate centers of each of the arms 50a, 50b.

Slidably attached to and selectively positionable along the length of the first arm 50a is a first pair of retention members 54a, 54b. Additionally, though not shown, slidably attached to and selectively positionable along the length of the second arm 50b is a second pair of retention members. The first and second pairs of retention members are identically configured to the retention members 36 previously described with respect to the first embodiment. The first and second pairs of retention members are preferably positioned on the arms 50a, 50b in a manner wherein the retention members capture the upper rim 22 of the inner bowl 20 when the distal ends of the arms 50a, 50b are engaged to the upper rim 18 of the outer bowl 16. The pivotal connection of the arms 50a, 50b to each other is provided for purposes of allowing the arms 50a, 50b to be folded in a manner facilitating easy storage. However, when the arms 50a, 50b are engaged to the upper rim 18 of the outer bowl 16, the second arm 50b of the pair is preferably oriented so as to extend in generally perpendicular relation to the first arm 50a of the pair. Unlike the arm segments 28a, 28b, 30a, 30b previously described with respect to the first embodiment, the arms 50a, 50b are non-telescoping. As such, the bracket member 48 of the second embodiment may not be engaged to outer bowls having a rim diameter substantially greater or less than the distance separating each pair of tab portions 34 from each other.

As previously explained, the ice molds 14, 46 each include the outer bowl 16 and the inner bowl 20. As seen in FIG. 4, the outer and inner bowl 16, 20 are preferably sized and configured such that when the inner bowl 20 is inserted into the fluid poured into the outer bowl 16 to a depth whereat the upper rim 22 is substantially co-planer with the upper rim 18, the distance separating the outer surface of the inner bowl 20 from the inner surface of the outer bowl 16 will be a substantially uniform when the inner bowl 20 is centered within the outer bowl 16 via the brackets 24, 48. As such, the resultant ice bowl 10 is formed having walls of substantially uniform thickness. Additionally, the volume of water which is initially poured into the outer bowl 16 is preferably such that when the inner bowl 20 is inserted thereinto and the upper rim 22 oriented in a co-planer relation to the upper rim 18, the level of the water forced upwardly between the outer and inner bowls 16, 20 will be disposed just below the wall portions 44 of the retention members. The wall portions 44 are preferably not submerged within the water since the freezing of the water with the wall portions 44 therewithin would create difficulties in removing the bracket members 24, 48 from the resultant ice bowl 10, as well as cause the formation of recessed regions in the inner surface of the ice bowl 10 adjacent the upper rim thereof. Advantageously, since in the ice molds 14, 46 the upper rims 18, 22 are co-planer when the outer and inner bowls 16, 20 are properly oriented relative each other, the arm segments 28a, 28b, 30a, 30b of the bracket member 24 and arms 50a, 50b of the bracket member 48 need not be flexed or bent to accommodate the upper rims 18, 22.

Referring now to FIGS. 5 and 6, illustrated is an ice mold 56 constructed in accordance with a third embodiment of the present invention. In the third embodiment, the ice mold 56 includes an outer bowl 57 which defines an upper rim 59, and an inner bowl 58 which defines an upper rim 60 and is sized to be receivable into the outer bowl 57. However, as seen in FIG. 5, the inner bowl 58 used in the third embodiment is sized and configured such that when the same is inserted into the fluid poured into the outer bowl 57 in a manner forcing the fluid upwardly between the outer surface of the inner bowl 58 and the inner surface of the outer bowl 57 to a desired level, the upper rim 60 is not disposed in co-planer relation to the upper rim 59, but rather is oriented substantially thereabove. This relative positioning of the upper rims 59, 60 of the outer and inner bowls 57, 58 typically occurs when conventional household bowls are utilized in association with the ice mold. In this respect, the ice molds 14, 46 previously described incorporate outer and inner bowls 16, 20 which are specially configured, while the ice mold 56 is created utilizing standard kitchen bowls 57, 58.

The ice mold 56 further comprises a bracket member 62 which is substantially similar to the bracket member 48, and includes a pair of elongate arms 64a, 64b which are pivotally connected to each other via a pivot pin 66 extending through the approximate centers thereof. The opposed, distal ends of the arms 64a, 64b are also adapted to be releasably engageable to the upper rim 59 of the outer bowl 57 and lip 61 extending radially thereabout in the same manner as previously described. The opposed, distal ends of the arms 64a, 64b of the bracket member 62 include tab portions 68, which like the tab portions 34 are also formed of reduced thickness, but also are formed to include an outwardly bowed lower edge 70. Advantageously, the formation of the tab portions 68 with the outwardly bowed lower edge 70 facilitates the receipt of the upper rim 59 and lip 61 between the opposed pairs of tab portions 68 when the bracket member 62 is engaged to the upper rim 59. Slidably attached to and selectively positionable along the length of the first arm 64a is a first pair of retention members 72a, 72b. Though not shown, slidably attached to and selectively positionable along the length of the second arm 64b is a second pair of retention members. The first and second pairs of retention members are identically configured to the retention members previously described with respect to the bracket members 24, 48.

Since, in the ice mold 56, the upper rim 60 of the inner bowl 58 is elevated above the upper rim 59 of the outer bowl 57 when properly positioned in the fluid therein, each of the arms 64a, 64b is provided with a pair of hinged portions 74 disposed intermediate the opposed distal ends thereof for allowing the distal ends to be selectively angled downwardly to properly engage the upper rim 59, as seen in FIGS. 5 and 6. Importantly, the retention members of the first and second pairs are each disposed between a hinged portion 74 and a respective distal end of the arms 64a, 64b. Additionally, as seen in FIG. 5, when the distal ends of the arms 64a, 64b are angled downwardly via the hinged portions 74 to accommodate the upper rims 59, 60, the upper rim 60 will be abutted against the sleeve portions 40 of the retention members, with only the lower edges of the wall portions 44 being abutted against the outer surface of the inner bowl 58. This particular orientation of the retention members relative the inner bowl 58 still prevents the drifting thereof relative the outer bowl 57 when the same is inserted into the fluid poured therewithin.

As will be recognized, the tab portions 34 of the bracket members 24, 48 may also be formed in the same manner as the tab portions 68 and provided with the outwardly bowed lower edges 70 to facilitate the receipt of the upper rim 18 of the outer bowl 16 therebetween. Additionally, in the bracket member 24, each of the segments 28a, 28b, 30a, 30b of the first and second pairs may include a hinge portion disposed between the distal end thereof and the hub member 26 to allow the distal end to be angled downwardly, thus allowing the bracket member 24 to be used with bowls similar to the outer and inner bowls 57, 58.

Referring now to FIG. 7, as an alternative to forming the distal ends of the arm segments 28a, 28b, 30a, 30b and the arms 50a, 50b with the tab portions 34, and the distal ends of the arms 64a, 64b with the tab portions 68, each distal end may be provided with an additional retention member 76 which is slidably attached to and selectively positionable along the length of a respective arm segment or arm, and identically configured to the retention members previously described with respect to the bracket members 24, 48, 62. In this respect, the wall portion 44 of each retention member 76 functions as a replacement for the tab portions 34, 68, with the retention members 76 being positioned on respective arm segments or arms in a manner wherein the upper rim 18, 59 of the outer bowl 16, 57 is captured between the retention members 76. As will be recognized, the use of the retention members 76 as an alternative to the tab portions 34, 68 on the bracket members 48, 62 allows the bracket members 48, 62 to be used with various outer bowls of differing upper rim diameter. Though, as shown in FIG. 7, the retention member 76 is engaged to the arm segment 28a of the bracket member 24, as previously explained, the retention members 76 may be engaged to any of the arm segments or arm members of the bracket members 24, 48, 62.

Figure 8:
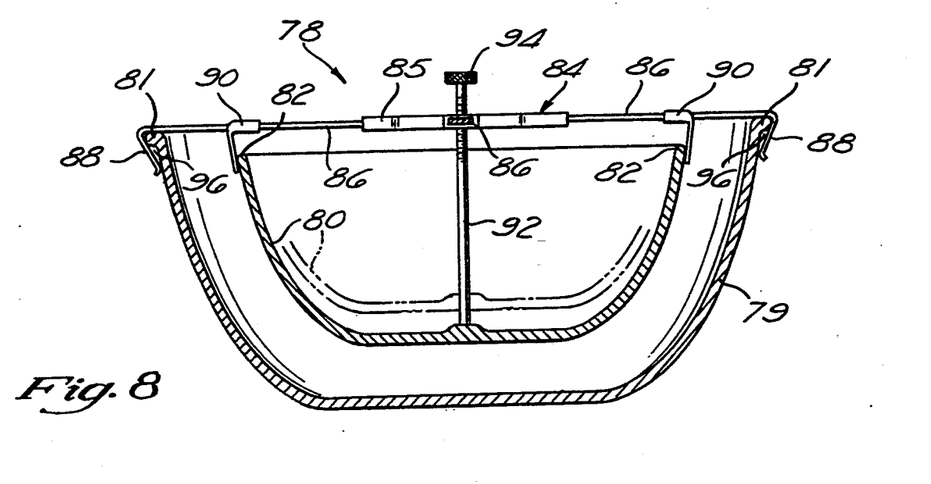
FIG. 8 is a cross-sectional view of an ice mold incorporating a bracket member constructed in accordance with a fourth embodiment of the present invention.

Referring now to FIG. 8, illustrated is an ice mold 78 constructed in accordance with a fourth embodiment of the present invention. In the fourth embodiment, the ice mold 78 includes an outer bowl 79 which defines on upper rim 81 and an inner bowl 80 which defines an upper rim 82 and is sized to be receivable into the outer bowl 79. Releasably engageable to the upper rim 81 of the outer bowl 79 is a bracket member 84 which is substantially identical to the bracket member 24 previously described, and includes a hub member 85 having four arm segments 86 telescopically engaged thereto and oriented at approximately 90 degree intervals thereabout. Formed on the distal ends of each of the arm segments 86 is a tab portion 88 which is identically configured to the tab portions 68 previously described with respect to the third embodiment. However, the distal ends of the arm segments 86 may alternatively be formed with tab portions which are identical to the tab portions 34 described with respect to the bracket members 24, 48. Slidably attached to and selectively positionable along each of the arm segments 86 is a retention member 90 which is identically configured to the retention members previously discussed with respect to the bracket members 24, 48, 62. The retention members 90 are positioned on the respective arm segments 86 in a manner wherein the retention members 90 capture the upper rim 82 of the inner bowl 80 and maintain the inner bowl 80 in a desired orientation relative the outer bowl 79 when the arm segments 86 are extended diametrically across and engaged to the upper rim 81 of the outer bowl 79.

The bracket member 84 further comprises an elongate coupling member 92 having a bottom end rigidly attached to the inner bowl 80 and a threaded top end which extends through and is threadably engaged to the hub member 85. Attached to the top end of the coupling member 92 is a knurled thumb wheel 94. As seen in FIG. 8, due to the threaded engagement of the coupling member 92 to the hub member 85, rotation of the thumb wheel 94 in a clockwise direction causes the inner bowl 80 to be lowered into the outer bowl 79, i.e. causes the upper rim 82 to move vertically downward relative the upper rim 81. Conversely, the rotation of the thumb wheel 94 in a counter-clockwise direction causes the inner bowl 80 to be raised within the outer bowl 79. As will be recognized, the maximum distance the inner bowl 80 may be raised via the counter-clockwise rotation of the thumb wheel 94 is to an elevation whereat the upper rim 82 is substantially co-planer with the upper rim 81 of the outer bowl 79, in that further upward movement is prevented by the abutment of the upper rim 82 against the retention members. In the fourth embodiment, the coupling member 92 may be fabricated with sufficient rigidity so as to eliminate the need for the retention members 90 in that the coupling member 92 itself may prevent the drifting of the inner bowl 80 within the outer bowl 79. Since it is desirable to tightly control the level at which the fluid is forced upwardly between the outer and inner bowls 79, 80, the rotation of the thumb wheel 94 in the clockwise direction will effectively raise the fluid level, while the rotation of the coupling member 92 in the counter-clockwise direction will lower the fluid level. As can be appreciated, the upward or downward movement of the inner bowl 80 as occurs when raising or lowering the fluid level results in slight increases or decreases in the bottom wall thickness of the ice bowl 10 due to the increase or decrease in the spacing between the bottom wall of the inner bowl 80 relative the bottom wall of the outer bowl 79 when the thumb wheel 94 is rotated. The inclusion of the coupling member 92 also presents other advantages which will be discussed below.

In utilizing the ice molds 14, 46, 56 and 78, a quantity of fluid is initially poured into the outer bowl 16, 57, 79. Thereafter, in the ice molds 14, 46, 56 the inner bowl 20, 58 is inserted into the fluid and submerged therein by applying downward pressure to the upper rim 22, 60 thereof, thus causing the fluid to be forced upwardly between the inner and outer bowls. When the fluid is forced upwardly to a desired level, the bracket member 24, 48, 62 is engaged to the upper rim 18, 59 of the outer bowl 16, 57 and the retention members adjusted so as to maintain the inner bowl 20, 58 in a desired orientation and level within the outer bowl 16, 57. Due to the upward force exerted on the inner bowl 20, 58 by the underlying fluid, it is often times desirable to pour an additional quantity of fluid into the inner bowl thus increasing the weight of the same and decreasing the upward force applied to the bracket members 24, 48, 62 when engaged to the upper rim 18, 59 of the outer bowl 16, 57. When the outer and inner bowls 57, 58 are used, the engagement of the bracket member 62 to the upper rim 59 of the outer bowl 57 includes the additional step of angling the distal ends of the arms 64a, 64b downwardly to accommodate the relative positioning of the upper rims 60, 59.

In utilizing the ice mold 78, the step of inserting the inner bowl 80 into the fluid poured into the outer bowl 79 occurs concurrently with the attachment of the bracket member 84 to the upper rim 81 due to the engagement of the inner bowl 80 to the bracket member 84 via the coupling member 92. After the bracket member 84 has been attached to the upper rim 81 of the outer bowl 79, the level of the fluid forced upwardly between the inner and outer bowls is adjusted via the selective rotation of the thumb wheel 94 in either the clockwise or counter-clockwise directions, Importantly, due to the rigid connection between the bracket member 84 and inner bowl 80 facilitated by the coupling member 92, the need to pour additional fluid into the interior of inner bowl 80 to increase the weight thereof is eliminated.

As seen in FIGS. 4, 5 and 8, when the bracket members 24, 48, 62, 84 are attached to their respective outer bowls 16, 57, 79 a slight gap 96 is defined between the lower most edge of the tab portions 34, 68, 88 and the lip 32, 61, 83 extending radially about the upper rim 18. Importantly, the tab portions 34, 68, 88 are specifically sized to define the gap 96 so as to allow for slight upward movement of the bracket members 24, 48, 62, 84 relative the outer bowl 16, 57, 79 to accommodate the expansion which occurs as the fluid freezes. Prior to the freezing of the fluid, after the bracket members 24, 48, 62, 84 have been attached to their respective outer bowls 16, 57, 79 and the fluid forced upwardly to a desired level, decorative materials such as flowers and large leaves are selectively positioned in the fluid between the outer an inner bowls.

After the fluid has been frozen, the bracket members 24, 48, 62 and 84 are removed from the respective outer bowls 16, 57, 79 with the outer bowls 16, 57, 79 being subsequently dipped into cold water. Thereafter, cold water is also poured into the interior of the inner bowls 20, 58, 80. As the inner and outer bowls gradually come away from the ice bowl 10, the inner bowl is removed from within the ice bowl 10 and the ice bowl 10 removed from within the outer bowl.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. An improved ice mold, comprising:
an outer bowl defining an upper rim;
an inner bowl having an upper rim and sized to be receivable into the outer bowl; and
a bracket member releasably engageable to the upper rims of said inner and outer bowls to maintain the inner bowl in a desired orientation relative to the outer bowl when a quantity of fluid is poured into the outer bowl and the inner bowl is inserted into the outer bowl in a manner forcing the fluid upwardly between the inner and outer bowls, said bracket member comprising:
a first elongate arm sized to extend diametrically across the upper rim of the outer bowl and having opposed distal ends which are releasably engageable to the upper rim of the outer bowl;
a second elongate arm connected to said first arm and sized to extend diametrically across the upper rim of the outer bowl, said second arm having opposed distal ends which are releasably engageable to the upper rim of the outer bowl;
a first pair of retention members slidably attached to and selectively positionable along the length of said first arm; and
a second pair of retention member slidably attached to and selectively positionable along the length of said second arm;
said first and second pairs of retention members being positioned on said first and second arms in a manner wherein said retention members capture the upper rim of the inner bowl when said first and second arms are engaged to the upper rim of the outer bowl.

2. The device of claim 1 wherein said second arm is pivotally connected to said first arm.

3. The device of claim 2 wherein said first and second arms each include a pair of hinge portions disposed intermediate the opposed distal ends thereof for allowing the distal ends of the first and second arms to be selectively angled downwardly.

4. An improved ice mold, comprising:

an outer bowl defining an upper rim;
an inner bowl having an upper rim and sized to be receivable into the outer bowl; and
a bracket member releasably engageable to the upper rims of said inner and outer bowls to maintain the inner bowl in a desired orientation relative to the outer bowl when a quantity of fluid is poured into the outer bowl and the inner bowl is inserted into the outer bowl in a manner forcing the fluid upwardly between the inner and outer bowls, said bracket member comprising:
a hub member;
a first pair of elongate arms attached to said hub member in an opposed, linear relation, each of the segments of the first pair being telescopically receivable into the hub member and including distal ends which are releasably engageable to the upper rim of the outer bowl when said first pair of segments are extended diametrically across the upper rim of the outer bowl;
a second pair of elongate arm segments attached to the hub member in an opposed, linear relation to each other and in perpendicular relation to the segments of the first pair, each of the segments of the second pair being telescopically receivable into the hub member and including distal ends which are releasably engageable to the upper rim of the outer bowl when said second pair of segments are extended diametrically across the upper rim of the outer bowl; and
a retention member slidably attached to and selectively positionable along each of the arm segments of the first and second pairs;
said retention members being positioned on the arm segments of the first and second pairs in a manner wherein the retention members capture the upper rim of the inner bowl when the first and second pairs of arm segments are engaged to the upper rim of the outer bowl.

5. The device of claim 4 wherein each of the arm segments of the first and second pairs includes a hinged portion disposed therein for allowing the distal ends of the arm segments to be selectively angled downwardly.

6. The device of claim 4 wherein said bracket member further comprises an elongate coupling member having a bottom end rigidly attached to said inner bowl and a top end threadably engaged to said hub member in a manner lowers the inner bowl into the outer bowl, while the counter-clockwise rotation of said coupling member raises the inner bowl within the outer bowl.

7. An improved ice mold, comprising:
an outer bowl defining an upper rim;
an inner bowl having an upper rim and sized to be receivable into the outer bowl; and
a bracket member releasably engageable to the upper rims of said inner and outer bowls to maintain the inner bowl in a desired orientation relative to the outer bowl when a quantity of fluid is poured into the outer bowl and the inner bowl is inserted into the outer bowl in a manner forcing the fluid upwardly between the inner and outer bowls, said bracket member comprising:
a first elongate arm sized to extend diametrically across the upper rim of the outer bowl;
a second elongate arm connected to said first arm and sized to extend diametrically across the upper rim of the outer bowl;

first and second pairs of retention members slidably attached to and selectively positionable along the length of said first arm; and third and fourth pairs of retention members slidably attached to and selectively positionable along the length of said second arm;

said first and second pairs of retention members being positioned on said first arm and said third and fourth pairs of retention members being positioned on said second arm in a manner wherein said first and third pairs capture the upper rim of the outer bowl and said second and fourth pairs capture the upper rim of the inner bowl when the first and third pairs are engaged to the upper rim of the outer bowl.

8. The device of claim 7 wherein said second arm is pivotably connected to said first arm.

9. The device of claim 8 wherein said first and second arms include a pair of hinged portions disposed intermediate the opposed distal ends thereof for allowing the distal ends of the first and second arms to be selectively angled downwardly.

10. A bracket used in a mold for forming a decorative ice bowl, said bracket comprising:
a first elongate arm sized to extend diametrically across an outer bowl and having opposed distal ends which are releasably engageable to the upper rim of the outer bowl;
a second elongate arm connected to said first arm and sized to extend diametrically across the outer bowl, said second arm having opposed distal ends which are releasably engageable to the upper rim of the outer bowl;
a first pair of retention members slidably attached to and selectively positionable along the length of said first arm; and
a second pair of retention members slidably attached to and selectively positionable along the length of said second arm;
said first and second pairs of retention members being positioned on said first and second arms in a manner wherein the first and second pairs capture the upper rim of an inner bowl when said first and second arms are engaged to the upper rim of the outer bowl.

11. The device of claim 10 wherein said second arm is pivotably connected to said first arm.

12. The device of claim 11 wherein said first and second arms each include a pair of hinge portions disposed intermediate the opposed distal ends thereof for allowing the distal ends of the first and second arms to be selectively angled downwardly.

13. A bracket used in a mold for forming a decorative ice bowl, said bracket comprising:
a hub member;
a first pair of elongate arm segments attached to said hub member in an opposed linear relation, each of the segments of the first pair being telescopically receivable in to the hub member and including distal ends which are releasably engageable to the upper rim of an outer bowl when the arm segments of said first pair are extended diametrically across the upper rim of the outer bowl;
a second pair of elongate arm segments attached to the hub member in opposed, linear relation to each other and in perpendicular relation to the arm segments of the first pair, each of the arm segments of the second pair being telescopically receivable into the hub member and including distal ends which are releasably engageable to the upper rim of the outer bowl when the arm segments of said second pair are extended diametrically across the upper rim of the outer bowl; and
a retention member slidably attached to and selectively positionable along each of the arm segments of the first and second pairs;
said retention members being positioned on the arm segments of said first and second pairs in a manner wherein the retention members capture the upper rim of an inner bowl when the first and second pairs of arm segments are engaged to the upper rim of the outer bowl.

14. The device of claim 13 wherein each of the arm segments of the first and second pairs includes a hinged portion disposed therein for allowing the distal ends of the segments to be selectively angled downwardly.

15. A bracket used in a mold for forming a decorative ice bowl, said bracket comprising:
a first elongate arm sized to extend diametrically across the upper rim of an outer bowl;
a second elongate arm connected to said first arm and sized to extend diametrically across the upper rim of the outer bowl;
first and second pairs of retention members slidably attached to and selectively positionable along the length of said first arm; and
third and fourth pairs of retention members slidably attached to and selectively positionable along the length of said second arm;
said first and second pairs of retention members being positioned on said first arm and said third and fourth pairs of retention members being positioned on said second arm in a manner wherein said first and third pairs capture the upper rim of the outer bowl and said second and fourth pairs capture the upper rim of an inner bowl when the first and third pairs are engaged to the upper rim of the outer bowl.

16. The device of claim 15 wherein said second arm is pivotably connected to said first arm.

17. The device of claim 16 wherein said first and second arms each include a pair of hinged portions disposed intermediate the opposed distal ends thereof for allowing the distal ends of the first and second arms to be selectively angled downwardly.

18. A method for forming a decorative ice bowl comprising the steps of:
pouring a quantity of fluid into an outer bowl;
inserting an inner bowl into the outer bowl in a manner forcing the fluid upwardly between the inner and outer bowls;
attaching a bracket member to the upper rim of the outer bowl in a manner wherein a pair of elongate arms of the bracket member extend diametrically across the upper rims of the inner and outer bowls;
adjusting the positions of first and second pairs of retention members slidably attached to respective ones of the elongate arms so as to maintain the inner bowl in a desired orientation relative the outer bowl; and
freezing the quantity of fluid between the inner and outer bowls to form said decorative ice bowl.

19. The method of claim 18, further comprising the step of pouring a quantity of fluid into the inner bowl subsequent to the placement of the inner bowl into the outer bowl.

20. The method of claim 18 further comprising the step of adjusting the lengths of each of the elongate arms of the bracket member so that the arms extend diametrically across the upper rim of the outer bowl.

21. The method of claim 18 further comprising the step of downwardly angling the distal ends of the arms of the bracket member to allow the distal ends to be engaged to the upper rim of the outer bowl when the inner bowl is inserted into the fluid poured therein.

22. The method of claim 18 further comprising the step of selectively rotating a coupling member of the bracket member to adjust the elevation of the inner bowl within the outer bowl.

23. The method of claim 18 further comprising the step of adjusting the positions of third and fourth pairs of retention members attached to respective ones of the arms of the bracket member in a manner wherein the third and fourth pairs of retention members capture the upper rim of the outer bowl when the bracket member is attached thereto.

* * * * *